United States Patent
Aoki et al.

(10) Patent No.: US 7,903,268 B2
(45) Date of Patent: Mar. 8, 2011

(54) PRINTER ENABLING USER TO SET ERROR RECOVERY METHOD FOR EACH ERROR CATEGORY

(75) Inventors: Noboru Aoki, Hitachinaka (JP); Seiji Kageyama, Hitachinaka (JP); Shinichi Kishi, Hitachinaka (JP); Muneyoshi Akai, Hitachinaka (JP); Susumu Hashimoto, Hitachinaka (JP); Hiroshi Udo, Hitachinaka (JP)

(73) Assignee: Ricoh Company, Ltd., Tokyo (JP)

( * ) Notice: Subject to any disclaimer, the term of this patent is extended or adjusted under 35 U.S.C. 154(b) by 1143 days.

(21) Appl. No.: 10/727,977

(22) Filed: Dec. 5, 2003

(65) Prior Publication Data

US 2004/0165209 A1    Aug. 26, 2004

(30) Foreign Application Priority Data

Dec. 6, 2002  (JP) ................ P2002-354847
Dec. 4, 2003  (JP) ................ P2003-405519

(51) Int. Cl.
*G06F 15/00*  (2006.01)

(52) U.S. Cl. .............. 358/1.14; 358/1.16; 358/1.9; 347/5; 347/19; 710/36

(58) Field of Classification Search ............... 358/1.15, 358/1.13, 1.14, 1.16, 1.9; 710/17, 36; 347/5, 347/19; 718/102; 714/9, 19; 700/200; 400/74; 711/162; 713/300
See application file for complete search history.

(56) References Cited

U.S. PATENT DOCUMENTS

| | | | | |
|---|---|---|---|---|
| 5,620,264 A | * | 4/1997 | Kagita | 400/74 |
| 5,625,757 A | * | 4/1997 | Kageyama et al. | 358/1.14 |
| 5,799,206 A | * | 8/1998 | Kitagawa et al. | 710/36 |
| 5,835,765 A | * | 11/1998 | Matsumoto | 718/102 |
| 6,144,457 A | * | 11/2000 | Higuchi | 358/1.14 |
| 6,327,051 B1 | * | 12/2001 | Moro et al. | 358/1.9 |
| 6,504,619 B1 | * | 1/2003 | Kageyama et al. | 358/1.14 |
| 6,604,017 B1 | * | 8/2003 | Richardson et al. | 700/223 |
| 6,724,494 B1 | * | 4/2004 | Danknick | 358/1.14 |
| 6,971,732 B1 | * | 12/2005 | Seshimo et al. | 347/19 |
| 6,985,257 B2 | * | 1/2006 | Kidani et al. | 358/1.9 |
| 7,085,904 B2 | * | 8/2006 | Mizuno et al. | 711/162 |
| 7,398,422 B2 | * | 7/2008 | Amano et al. | 714/19 |

(Continued)

FOREIGN PATENT DOCUMENTS

JP    2003-170643    6/2003

(Continued)

OTHER PUBLICATIONS

Japanese Office Action with English Translation.

*Primary Examiner* — Edward L Coles
*Assistant Examiner* — Ashish K Thomas
(74) *Attorney, Agent, or Firm* — Whitham Curtis Christofferson & Cook, PC

(57) ABSTRACT

As a user selects one of error recovery methods for each error category, and the selected method is stored in a memory. When an error occurs, an error recovery method corresponding to an error category of the error is detected. If the detected method is automatic print continuation, then the error is ignored and print operation is automatically continued. If the detected method is a recovery by user's operation, then an error message is displayed, and a procedure is performed in accordance with an instruction from the user.

15 Claims, 11 Drawing Sheets

U.S. PATENT DOCUMENTS

| | | | |
|---|---|---|---|
| 7,543,165 B2* | 6/2009 | Inoue | 713/300 |
| 7,656,548 B2* | 2/2010 | Hagiwara | 358/1.15 |
| 2002/0039116 A1* | 4/2002 | Hashimoto | 347/5 |
| 2003/0025928 A1* | 2/2003 | Nagasawa et al. | 358/1.14 |

FOREIGN PATENT DOCUMENTS

| | | |
|---|---|---|
| WO | JP 63-059622 | 3/1988 |
| WO | JP 6030146 | 2/1994 |
| WO | JP 2002-311759 | 10/2002 |

* cited by examiner

FIG.2

| AUTOMATIC PRINT CONTINUATION | | |
|---|---|---|
| ERROR CATEGORY | CONTINUE TO PRINT ? | |
| SHEET SIZE MISMATCH ERROR | ○ YES | ● NO |
| FONT SELECTION ERROR | ● YES | ○ NO |
| DEVICE CONFIGURATION MISMATCH ERROR | ● YES | ○ NO |
| USER DATA ERROR | ○ YES | ● NO |
| MAX TIME FOR OPERATION | 300 SECONDS | |
| OK | CANCEL | |

| OPERATION GUIDANCE | |
|---|---|
| ERROR RECOVERY PROCESS: PRINTING CONTINUATION | ○ YES  ● NO |
| ERROR: | SHEET SIZE MISMATCH |
| GUIDANCE: | IGNORE ERROR AND CONTINUE TO PRINT |
| OK | CANCEL |

| CLASSIFICATION CODE OF ERROR | DETAIL CODE OF ERROR |
|---|---|
| 0x10 | 0x100001 |
| 0x10 | 0x100002 |
| 0x10 | 0x100003 |
| 0x10 | 0x100004 |
| ⋮ | ⋮ |
| 0x20 | 0x100001 |
| 0x20 | 0x100002 |
| ⋮ | ⋮ |
| 0xMM | 0xNNNNNN |

FIG.5

| CLASSIFICATION CODE OF ERRORS | DETAIL CODE OF ERRORS |
|---|---|
| 0x10: SHEET SIZE MISMATCH ERROR | 0x10 0001: SHEET SIZE IS SMALLER THAN SPECIFIED<br>0x10 0002: SHEET SIZE IS LARGER THAN SPECIFIED |
| 0x20: FONT SELECTION ERROR | 0x20 0001: NO FONT FOR SPECIFIED "TYPEFACE" ATTRIBUTE<br>0x20 0002: NO FONT FOR SPECIFIED "SYMBOL SET" ATTRIBUTE<br>0x20 0003: NO FONT FOR SPECIFIED "STYLE" ATTRIBUTE<br>0x20 0004: NO FONT FOR SPECIFIED "SPACING" ATTRIBUTE<br>0x20 0005: SPECIFIED CHARACTER PITCH IS OUT OF RANGE<br>0x20 0006: SPECIFIED POINT SIZE OUT OF RANGE<br>0x20 0007: SPECIFIED STROKE WEIGHT OUT OF RANGE |
| 0x30: DEVICE CONFIGURATION MISMATCH ERROR | 0x30 0001: DUPLEX DATA SPECIFIED FOR SIMPLEX PRINTER<br>0x30 0002: SPECIFIED INPUT TRAY NOT FOUND<br>0x30 0003: SPECIFIED OUTPUT STACKER (BIN) NOT FOUND |
| 0x40: USER DATA ERROR | 0x40 0001: SPECIFIED PDL NOT FOUND<br>0x40 0002: INVALID COMMAND IN PDL<br>0x40 0003: UNDEDINED COMMAND IN PDL<br>0x40 0004: INVALID DATA FORMAT OF DOWNLOADED FONT<br>0x40 0005: SPECIFIED DOWNLOADED FONT NOT FOUND<br>0x40 0006: MEMORY CAPACITY NOT SUFFICIENT IN READING DOWNLOADED FONT<br>0x40 0007: MEMORY CAPACITY NOT SUFFICIENT IN WRITING DOWNLOADED FONT<br>0x40 0008: READ ERROR FOR DOWNLOADED FONT<br>0x40 0009: WRITE ERROR FOR DOWNLOADED FONT<br>0x40 000A: DOWNLOADED OVERLAY DATA FORMAT IS INVALID<br>0x40 000B: SPECIFIED OVERLAY DATA FILE NOT FOUND<br>0x40 000C: MEMORY CAPACITY NOT SUFFICIENT FOR DOWNLOADED OVERLAY DATA IN READING<br>0x40 000D: READ ERROR FOR DOWNLOADED OVERLAY DATA<br>0x40 000E: WRITE ERROR FOR DOWNLOADED OVERLAY DATA |

FIG.6
| ERROR CATEGORY | ERROR RECOVERY METHOD |
|---|---|
| 0x10: SHEET SIZE MISMATCH ERROR | 0x00: RECOVERY BY USER OPERATION |
| 0x20: FONT SELECTION ERROR | 0x01: AUTOMATIC CONTINUATION |
| 0x30: DEVICE CONFIGURATION MISMATCH ERROR | 0x01: AUTOMATIC CONTINUATION |
| 0x40: USER DATA ERROR | 0x00: RECOVERY BY USER OPERATION |
FIG.7
NOTE
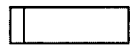 · · · CALL PROCEDURE
 · · · CALL SYSTEM CALL OF OS (OPERATING SYSTEM)
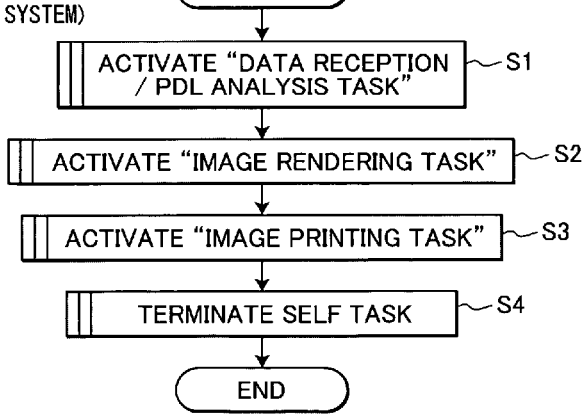
PRINT CONTROL PROGRAM

DATA RECEPTION / PDL ANALYSIS TASK

IMAGE RENDERING TASK

IMAGE PRINTING TASK

ERROR RECOVERY PROCEDURE

FONT SELECTION ERROR RECOVERY PROCEDURE

DEVICE CONFIGURATION MISMATCH
ERROR RECOVERY PROCEDURE

PRINTER ENABLING USER TO SET ERROR RECOVERY METHOD FOR EACH ERROR CATEGORY

BACKGROUND OF THE INVENTION

1. Field of the Invention

The present invention relates to a print device.

2. Related Art

There have been proposed various kinds of printers that print images on recording media based on data supplied from a host computer or the like. One type of such printers automatically executes an error recovery procedure when an error occurs during printing, and other type of printer executes an error recovery procedure in accordance with user's operation (instruction). A print error arises when it is not possible for the printer to perform a print operation according to the received print data, and a print operation is suspended when an error occurs. A print error occurs, for example, when a recording medium that meets the printing requirements specified by the print data is not accommodated in the printer. In this case, a user has to follow a predetermined error recovery procedure to resume the suspended print operation.

Print errors include those that need to be dissolved to resume the print operation and those that can be ignored to resume the print operation. Japanese Patent Application-Publication No. 2003-170643 has proposed a printer that ignores an error and automatically continues an ongoing print operation if the ongoing print operation can be continued by ignoring the error. There has also been provided a printer that enables a user to set whether to automatically ignore an error to continue a print operation or to suspend the print operation so that error recovery procedure can be executed in accordance with user's operation when an error which can be ignored occurs.

However, in conventional printers, the user can simply set automatic print continuation or recovery by user's operation as an error recovery method for all errors that the printer can neglect, although there may be errors for which the user wants an automatic print continuation and those for which the user wants a recovery by user's operation. In other words, when an automatic print continuation is set as an error recovery method, a print operation is always continued whenever a print error that the printer can ignore occurs, and hence the print operation is not suspended for allowing the user to follow an appropriate error recovery procedure. Thus, there has been a problem that a printing result differs from expected one.

On the other hand, however, requiring a user to set automatic print continuation or recovery by user's operation for each one of the errors and to set a recovery procedure for each error will place great burden on the user since there are a large number of errors.

SUMMARY OF THE INVENTION

In the view of foregoing, it is an object of the present invention to overcome the above problems, and also to provide a printer that enables a user to set an error recovery method for each of error categories and that is excellent in operationality.

In order to attain the above and other objects, the present invention provides a printer including a printing unit that performs a print operation to print images on a recording medium based on print data, a setting unit that sets one of error recovery methods for each of a plurality of error categories, the error recovery methods including an automatic print continuation and a recovery by user's operation, a memory that stores a correspondence data indicating the set error recovery method of each error category, an error detecting unit that detects an error during the print operation, an error category detecting unit that detects an error category of the detected error, a method detecting unit that detects an error recovery method corresponding to the detected error category with reference to the correspondence data stored in the memory, and an error recovery unit that executes an error recovery procedure according to the error recovery method detected by the method detecting unit.

There is also provided a storing medium storing a control program for controlling a printer. The control program includes the programs of performing a print operation to print images on a recording medium based on print data, setting one of error recovery methods for each or a plurality of error categories, the error recovery methods including an automatic print continuation and a recovery by user's operation, detecting an error during the print operation, detecting an error category of the detected error, detecting an error recovery method corresponding to the detected error category with reference to correspondence data stored in a memory, and executing an error recovery procedure according to the detected error recovery method.

BRIEF DESCRIPTION OF THE DRAWINGS

In the drawings:

FIG. 2 is a view showing an automatic print continuation setting window displayed on a display device of the printer of FIG. 1;

FIG. 3 is a view showing an operation guide message window displayed on the display device;

FIG. 4 is a view showing a file structure of an error category correspondence file stored in a non-volatile memory of the printer;

FIG. 5 is a diagram illustrating the meaning of each classification code and that of each detail code;

FIG. 6 is a view showing a file structure of an error recovery method specification file stored in the non-volatile memory;

FIG. 7 is a flowchart representing a print control procedure according to the embodiment of the present invention;

PREFERRED EMBODIMENT OF THE PRESENT INVENTION

Figure 1:
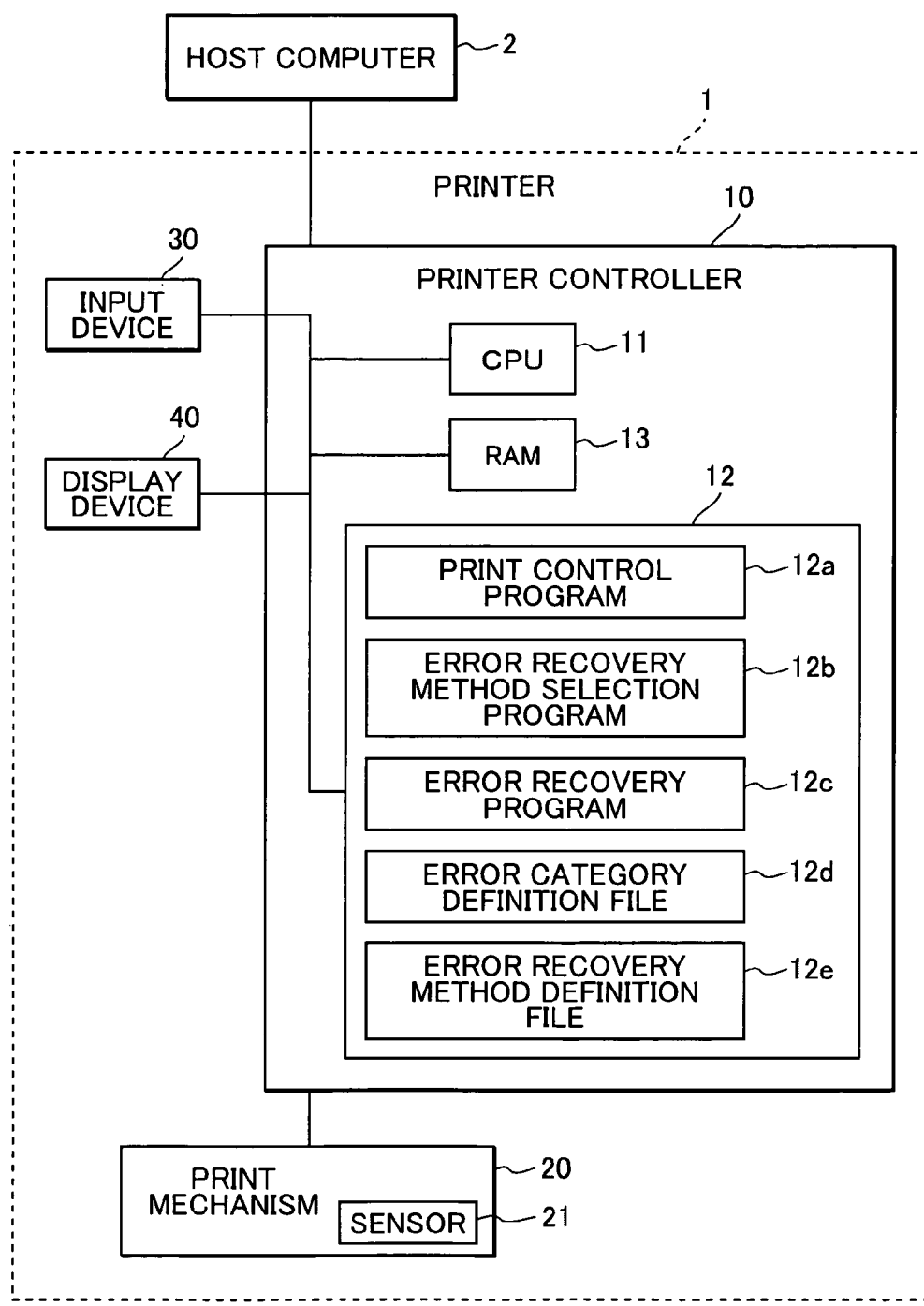
FIG. 1 is a block diagram of a printer according to an embodiment of the present invention.

Next, a printer according to an embodiment of the present invention will be described with reference to the accompanying drawings. FIG. 1 is a schematic block diagram of a printer 1 according to the present embodiment.

As shown in FIG. 1, the printer 1 includes a printer controller 10, a print mechanism 20, an input device 30, and a display device 40, and is connected to an external host computer 2. The printer controller 10 has a central processing unit (CPU) 11, a nonvolatile memory 12, and a random access memory (RAM) 13. The nonvolatile memory 12 stores a print control program 12a, an error recovery method selection program 12b, an error recovery program 12c, an error category definition file 12d, and an error recovery method definition file 12d. The CPU 11 controls the various components of the printer 1 according to the programs stored in the nonvolatile memory 12. The print mechanism 20 prints images on a recording medium, such as a sheet of paper, under the control of the printer controller 10. The input device 30 is an interactive device that includes a keyboard and a mouse (not shown). A user can input various settings and instructions through operation on the input device 30. The display device 40 is a device for interactive processing operations and displays various windows including an automatic print continuation setting window 41 (FIG. 2) and an operation guide message window 42 (FIG. 3). The host computer 2 transmits print data written in a page description language (PDL) format to the printer 1.

The print control program 12a is for a printing control procedure including an error recovery procedure to be described later. The error recovery method selection program 12b allows the user to select an error recovery method for each error category and updates the error recovery method definition file 12d according to the error recovery method selected by the user. The error recovery program 12c is for, depending on an error category of a detected error, automatically executing an error recovery procedure or controlling the display device 40 to display, on the operation guide message window 42, an error message and an operation guide message corresponding to the error category so as to prompt the user to input an instruction as to whether to continue printing or not.

With the above-described configuration, when print data in PDL format is transmitted from the host computer 2, the CPU 11 invokes the print control program 12a, prepares image data based on the received print data in PDL format, modulates the image data into a video signal, and sends the video signal to the print mechanism 20 for print errors that can occur in a print operation are classified into a plurality or error categories in accordance with the nature of the errors. In this embodiment, the errors are classified into four categories including "sheet size mismatch error", "font selection error", "device configuration mismatch error", and "user data error" (see FIG. 5). The "sheet size mismatch error" occurs when the size of recording sheet mounted in the print mechanism 20 does not agree with the size specified by the PDL received from the host computer 2. The "font selection error" occurs when the printer controller 10 does not have a font whose attributes match the font attributes specified by the received PDL. That is, among errors shown in FIG. 5, errors from an error "no font for specified "typeface" attribute" to an error "specified stroke weight out of range" are classified into a category "font selection error", and it is determined that a font selection error occurs when one of these errors occurs. The "device configuration mismatch error" occurs when the print mechanism 20 cannot perform a print operation in a specified manner for mechanical reasons. The "device configuration mismatch error" occurs, for example, when the received printing request requires duplex printing (both-side printing) although the print mechanism 20 can only perform simplex printing (one-side printing). The "user data error" occurs, for example, when received PDL is in a data format that the printer 1 cannot deal with or when a specified form overlay file is not provided in the printer 1. As shown in FIG. 5, errors that may occur in the printer 1 are classified into "sheet size mismatch error", "font size mismatch error", "device configuration mismatch error", and "user data error" according to nature of each error.

In this embodiment, an error code is assigned to each error. Each error code has a bit format of "xxxxxxxxNNNNNNNN (1 word), of which xxxxxxxx is defined as classification code and NNNNNNNN is defined as detail code. The error category definition file 12d lists as many error codes as the number of all possible errors. In other words, the error category definition file 12d stores, in a map format, the classification codes in one-to-one correspondence with the detail codes as shown in FIG. 4. FIG. 5 illustrates the meaning of each classification code, the meaning of each detail code, and the correspondence between the classification codes and the detail codes.

In this embodiment, a user sets an error recovery method for each error category in a following manner. Before starting a print operation or when a print operation is being suspended, the user invokes the error recovery method selection program 12b through operation on the input device 30. More specifically, as the user operates the input device 30 according to a predetermined procedure, the CPU 11 invokes the error recovery method selection program 12b and controls the display device 40 to display the automatic print continuation setting window 41 as shown in FIG. 2.

Then, the user decides whether or not to set (select) an automatic print continuation for each error category on the automatic print continuation setting window 41. In this embodiment, the window 41 displays the four error categories of "sheet size mismatch error", "font selection error", "device configuration mismatch error", and "user data error", enabling the user to specify whether or not to execute the automatic print continuation for each error category using radio buttons.

In the example shown in FIG. 2, an automatic print continuation is not selected for "sheet size mismatch error" and "user data error", that is, a recovery by user's operation is elected for these categories, and an automatic print continuation is selected for "font selection error", and "device configuration mismatch error". The settings made by the user on the automatic print continuation setting window 41 is stored in the error recovery method definition file 12d as error recovery methods. FIG. 6 illustrates the file structure of the error recovery method definition file 12d.

The user can also specify a maximum time for operation on the automatic print continuation setting window 41. The maximum time for operation is a maximum time period given to the user when the operation guide message window 42 is displayed as described later. The specified maximum time for operation is stored in a predetermined address of the error recovery method definition file 12d in the nonvolatile memory 12.

Next, a procedure executed in the printer controller 10 will be described. When the printer controller 10 is started, firstly the print control program 12a is invoked as a root task, and a procedure shown in FIG. 7 starts. The print control program (FIG. 7) activates a data reception/PDL analysis task (S1), activates an image rendering task (S2), activates an image printing task (S3), and issues an command for terminate a self task (S4). Then, the self task ends. Afterwards, the data reception/PDL analysis task, the image rendering task, and the image printing task are all executed concurrently as multitask. These procedures will be described next.

Figure 8:
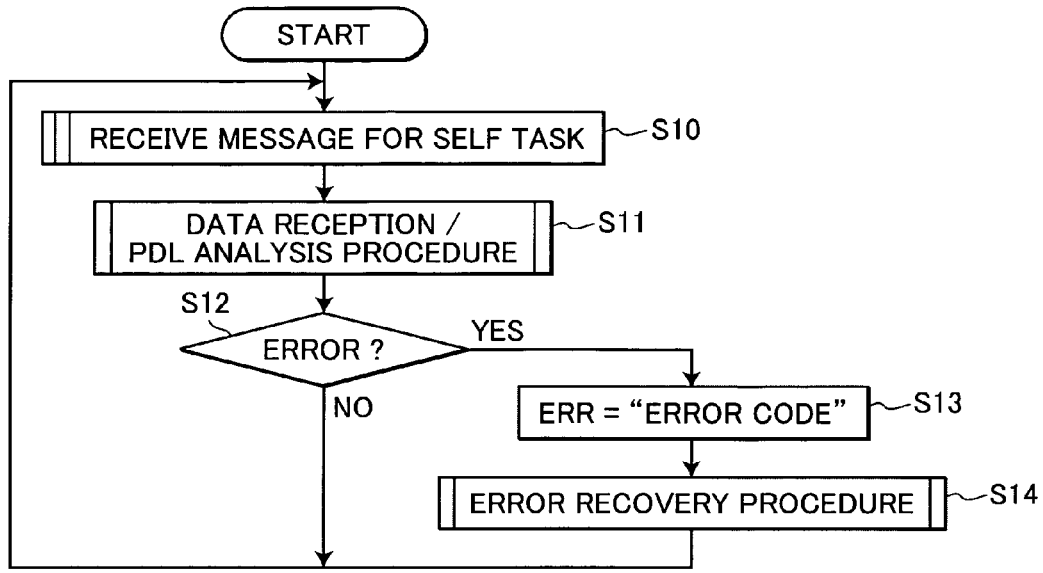
FIG. 8 is a flowchart representing a data reception/PDL analysis task according to the embodiment of the present invention.

The data reception/PDL analysis task will be described with reference to the flowchart in FIG. 8. In this task, a message for self task is received in S10. In S11, a PDL analysis is executed. That is, in accordance with the received message for self task, print data in the PDL format is received and converted into a command string that the image rendering task can process. However, if a font error, a downloaded font error, or a PDL-undefined command error is detected, the operation of converting the print data into a command string is suspended. Then, the procedure proceeds to S12.

In S12, it is determined whether or not such an error has occurred. If it is determined in S12 that no error has occurred (S12: NO), then the procedure returns to S10 to repeat the loop. On the other hand, if it is determined in S12 that an error has occurred (S12: YES), then in S13 a variable Err is set to an error code corresponding to the error, and an error recovery procedure is executed in S14. Thereafter, the procedure returns to S10 to repeat the loop. Detailed description of the error recovery procedure will be described later.

Figure 9:
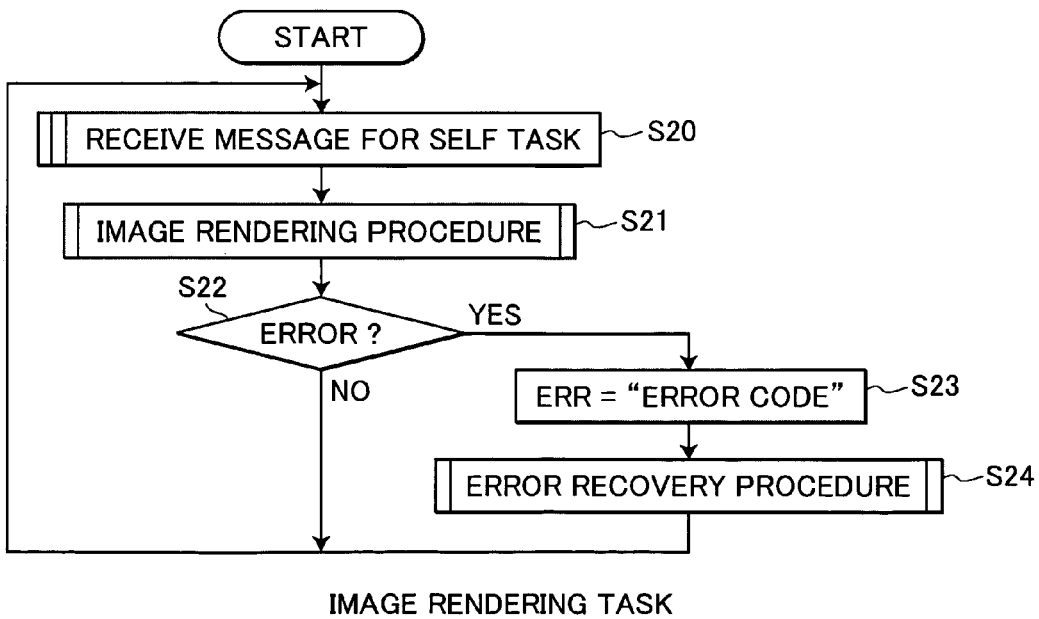
FIG. 9 is a flowchart representing an image rendering task according to the embodiment of the present invention.

The image rendering task will be described with reference to the flowchart in FIG. 9. First in S20, a message for self task is received, and then in S21, an image drawing procedure is executed in accordance with the received message for self task. That is, the command string generated in the above-described data reception/PDL analysis task is received and converted into image data in a data format that the print mechanism 20 can use for printing (e.g., bitmap data). However, if an error is detected during the data converting procedure in S21, the procedure for converting the command string into image data in S21 is suspended. Then, the procedure proceeds to S22. In S22, it is determined whether or not an error has occurred. If it is determined in S22 that no error has occurred (S22: NO), then the procedure returns to S20 to repeat the loop. On the other hand, if it is determined in S22 that an error has occurred (S22: YES), then in S23 the variable Err is set to an error code corresponding to the error, and the error recovery procedure is executed in S24. Thereafter, the procedure returns to S20 to repeat the loop.

Figure 10:
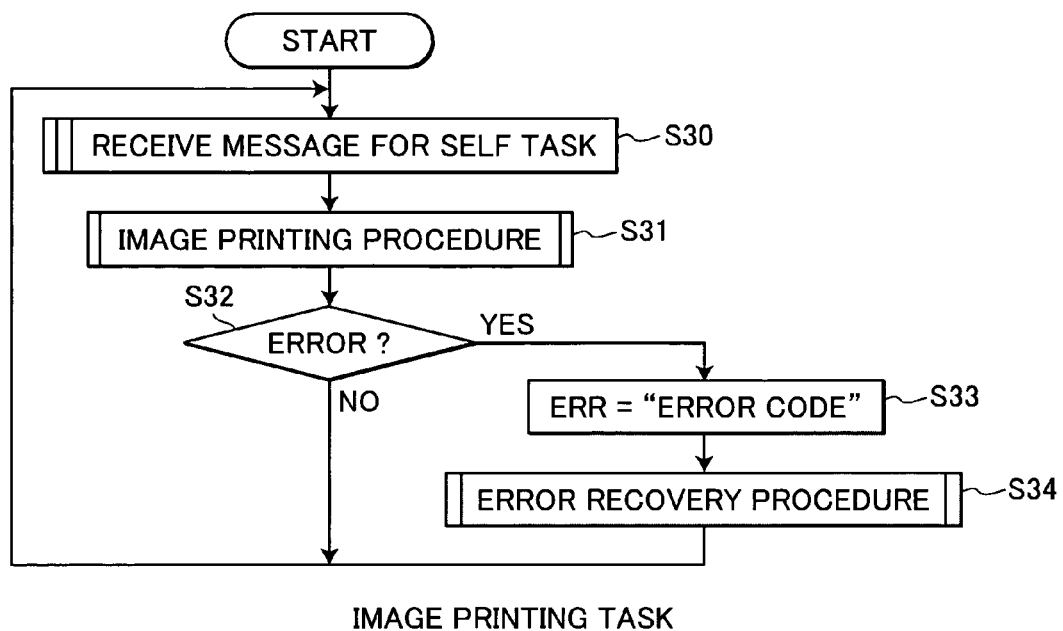
FIG. 10 is a flowchart representing an image printing task according to the embodiment of the present invention.

The image printing task will be described with reference to the flowchart of FIG. 10. In this task, a message for self task is received in S30. Then, in S31, an image printing procedure is executed in accordance with the received message for self task. That is, in the image printing procedure in S31, the image data generated in the above-described image rendering task (FIG. 9) is modulated into a video signal and transmitted to the print mechanism 20. Also, the print mechanism 20 is controlled to perform a print operation based on the video signal. Afterwards, the procedure proceeds to S32. In S32, it is determined whether or not an error has occurred. If it is determined in S32 that no error has occurred (S32: NO), then the procedure returns to S30 to repeat the loop. On the other hand, if it is determined in S32 that an error has occurred (S32: YES), then in S33 the variable Err is set to an error code corresponding to the error, and the error recovery procedure is executed in S34. Then, the procedure returns to S30 to repeat the loop.

Here, in the image printing procedure in S31, a size check is performed before printing. That is, the size of recording sheets mounted in the print mechanism 20 is detected using a sensor 21 (FIG. 1) and compared with the sheet size specified by the received image data. If these two do not match, then a sheet size mismatch error occurs, and the procedure proceeds to S32 while suspending procedures for transferring the image data (video signal) and for controlling the print mechanism 20.

Next, the error recovery procedure will be described with reference to the flowcharts in FIGS. 11 through 15. The error recovery procedure is a procedure that is called in S14 of the data reception/PDL analysis task, S24 of the image rendering task, or S34 of the image printing task.

Figure 11:
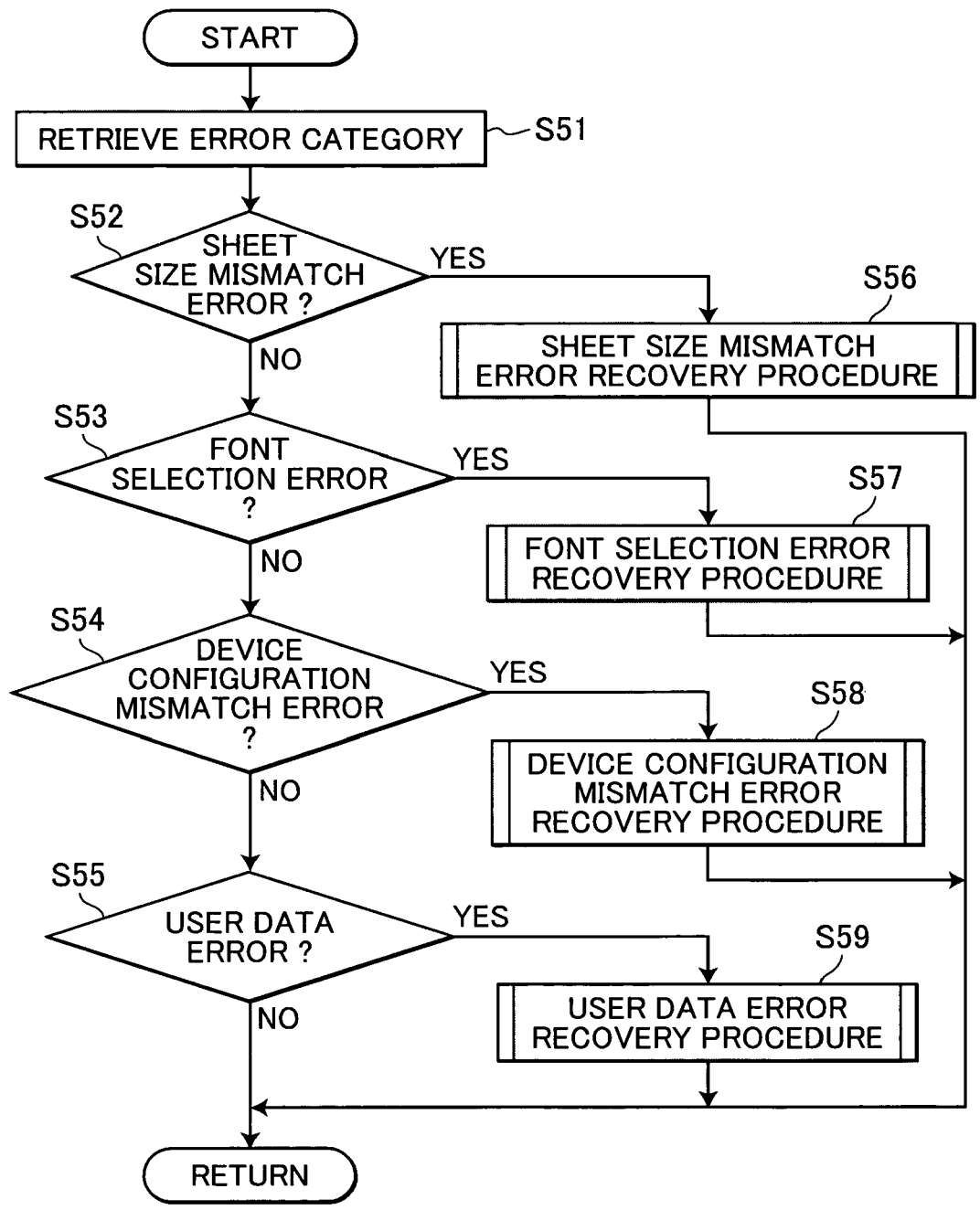
FIG. 11 is a flowchart representing an error recovery procedure according to the embodiment of the present invention.

In the error recovery procedure, first in S51 of FIG. 11, an error category corresponding to the error code Err is retrieved by referring to the error category definition file 12d (FIG. 4). Then, in S52, it is determined whether or not the retrieved error category is "sheet size mismatch error" (i.e., whether or not the classification code is "0x10"). If so (S52: YES), then a sheet size mismatch error recovery procedure is executed in S56, and the procedure returns. On the other hand, if not (S52: NO), it is determined in S53 whether or not the retrieved error category is "font selection error" (i.e., whether or not the classification code is "0x20"). If so (S53: YES), then a font selection error recovery procedure is executed in S57, and the procedure returns. On the other hand, if not (S53: NO), then it is determined in S54 whether or not the retrieved error category is "device configuration mismatch error" (i.e., whether or not the classification code is "0x30").

If so (S54: YES), then a device configuration mismatch error recovery procedure is executed in S58, and then the procedure returns. On the other hand, if not (S54: NO), then it is determined in S55 whether or not the retrieved error category is "user data error" (i.e., whether or not the classification code is "0x40"). If so (S55: YES), then a user data error recovery procedure is executed in S59, and then the procedure ends. On the other hand, if not (S54: NO), then the procedure returns.

Figure 12:
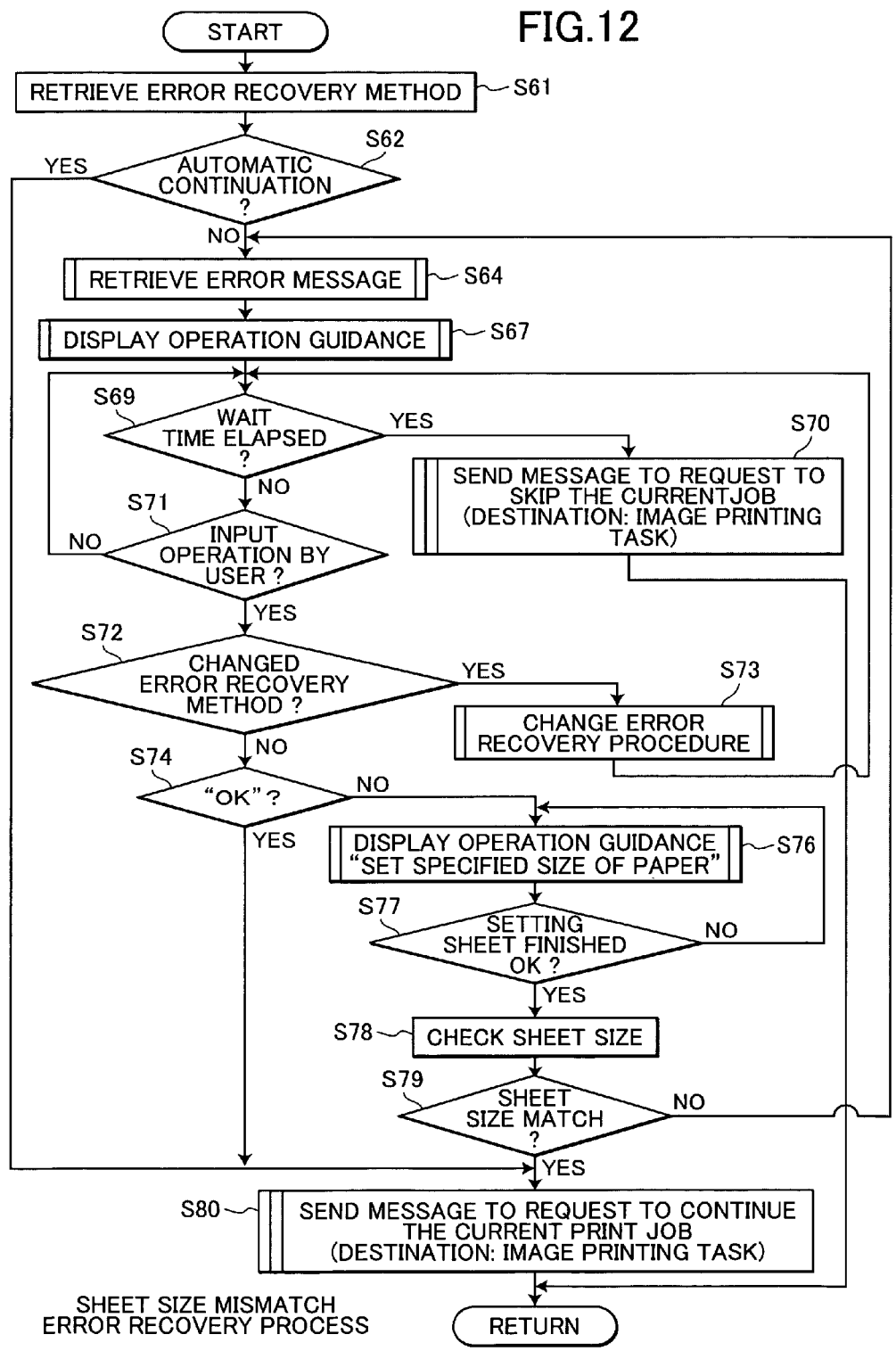
FIG. 12 is a flowchart representing a font mismatch error recovery procedure according to the embodiment of the present invention.

The sheet size mismatch error recovery procedure that is called and executed in S56 of FIG. 11 will be described with reference to the flowchart in FIG. 12. In S61, an error recovery method that corresponds to the "sheet size mismatch error" is retrieved based on the classification code with reference to the error recovery method definition file 12d (FIG. 6). Then, in S62, it is determined whether or not the retrieved error recovery method is the automatic print continuation. If so (562: YES), then the procedure proceeds to S80. If not (S62: NO), this means that the corresponding error recovery method is a recovery by user's operation, and the procedure proceeds to S64. In S64, an error message corresponding to the retrieved error code is retrieved. In S67, a guide message corresponding to the error code is searched, and then the operation guide message window 42 shown in FIG. 3 is displayed on the display device 40. The operation guide message window 42 displays the error message (e.g., "sheet size mismatch") and the error recovery method which has set by the user, and asks the user if he or she wants to ignore the error and continue with the ongoing printing procedure. The user can direct whether to execute an automatic print continuation or not by selecting OK button or CANCEL button, whichever appropriate. The user also can change the error recovery method using radio buttons on the operation guide message window 42.

Thereafter, the procedure proceeds to S69, where it Is determined whether or not a wait time has elapsed. Here, the wait time is the maximum time that the user has input on the automatic print continuation setting window 41. If it is determined that the wait time has not elapsed (S69: NO), then it is determined in S71 whether or not an input operation is performed by the user on the operation guide message window 42. If no input operation is performed (S71: NO), then the procedure returns to S69.

Here, if infinity has been set for the maximum time for operation, the procedure keeps waiting for an input operation by the user, while the display device 40 keeps displaying the operation guide message window 42. On the other hand, if nil has been set for the maximum time for operation, a positive determination is immediately made in S69 (S69: YES), and the procedure proceeds to S70. It should be noted that if nil is set for the maximum time for operation, the procedure could alternatively proceed to S70 after erasing the operation guide message window 42 when a negative determination is made in S64 (S64: NO).

In S72, it is determined whether or not the input operation by the user is for changing the error recovery method. If so (S72: YES), then an error recovery method specification file update procedure is executed in S73. In this procedure, the error recovery method definition file 12d is updated based on the change made on the operation guide message window 42, and also the operation guide message window 42 is updated in accordance with the change. Then, the procedure returns to S69. On the other hand, if not (S72: NO), it is determined in S74 whether or not the OK button has been pressed by the user. If so (S74: YES), then the procedure proceeds to S80.

If it is determined in S74 that the OK button has not been pressed (S74: NO), this means that the CANCEL button has been pressed, and then the procedure proceeds to S76. In S76, an operation guide message "please set specified size of paper" is displayed on the display device 40, prompting the user to set recording sheets in the print mechanism 20. Then, in S77, it is determined whether or not a recording sheet is set in the print mechanism 20 based on a status of the sensor 21 (FIG. 1) provided to the print mechanism 20. If it is determined that a recording sheet has not been set (S77: NO), then the procedure returns to S76. If it is determined that a recording sheet has been set (S77: YES), then the procedure proceeds to S78. (The determination as to whether a recording sheet has been set is made based on a detection signal from the sensor 21 (FIG. 1) provided to the print mechanism 20.)

In S78, the size of the recording sheet set in the print mechanism 20 is detected based on a detection signal from the sensor 21. In S79, it is determined whether or not the detected size of the recording sheet matches the specified size. If not (S79: NO), then the procedure returns to S64. If so (S79: YES), then the procedure proceeds to S80.

In S80, a message to request to continue the current print job is transmitted to the image printing task as a message for self task, and subsequently the procedure returns. If the image printing task receives in S30 (FIG. 10) the message for self task which has been transmitted in S80, an image printing procedure is executed in S31. At this time, if the actual size of the recording sheet provided in the print mechanism 20 agrees with the specified size, then an image is printed in a printing region of the recording sheet without any segments of the image being clipped. However, if the size of the recording sheet is smaller than the specified size, then an image is printed in a printing region of the recording sheet with segments of the image outside of the printing region being clipped. If the size of the recording sheet is larger than the specified size, then an image is printed in a printing region of the recording sheet without any segments being clipped.

If it is determined in S69 that the wait time has elapsed (S69: YES), this means that the user has not performed any input operation, and then the procedure proceeds to S70. In S70, a message to request to skip the current job is transmitted to the image printing task as a message for self task, and subsequently the procedure returns. If the image printing task receives in S30 (FIG. 10) the message for self task which has been transmitted in S70, then the current print job is suspended in S31, and waits for reception of a next message for self task (next print job). Here, the suspended print job is stored in the nonvolatile memory 12 as a print queue so that the print operation may be resumed by the user as desired.

Figure 13:
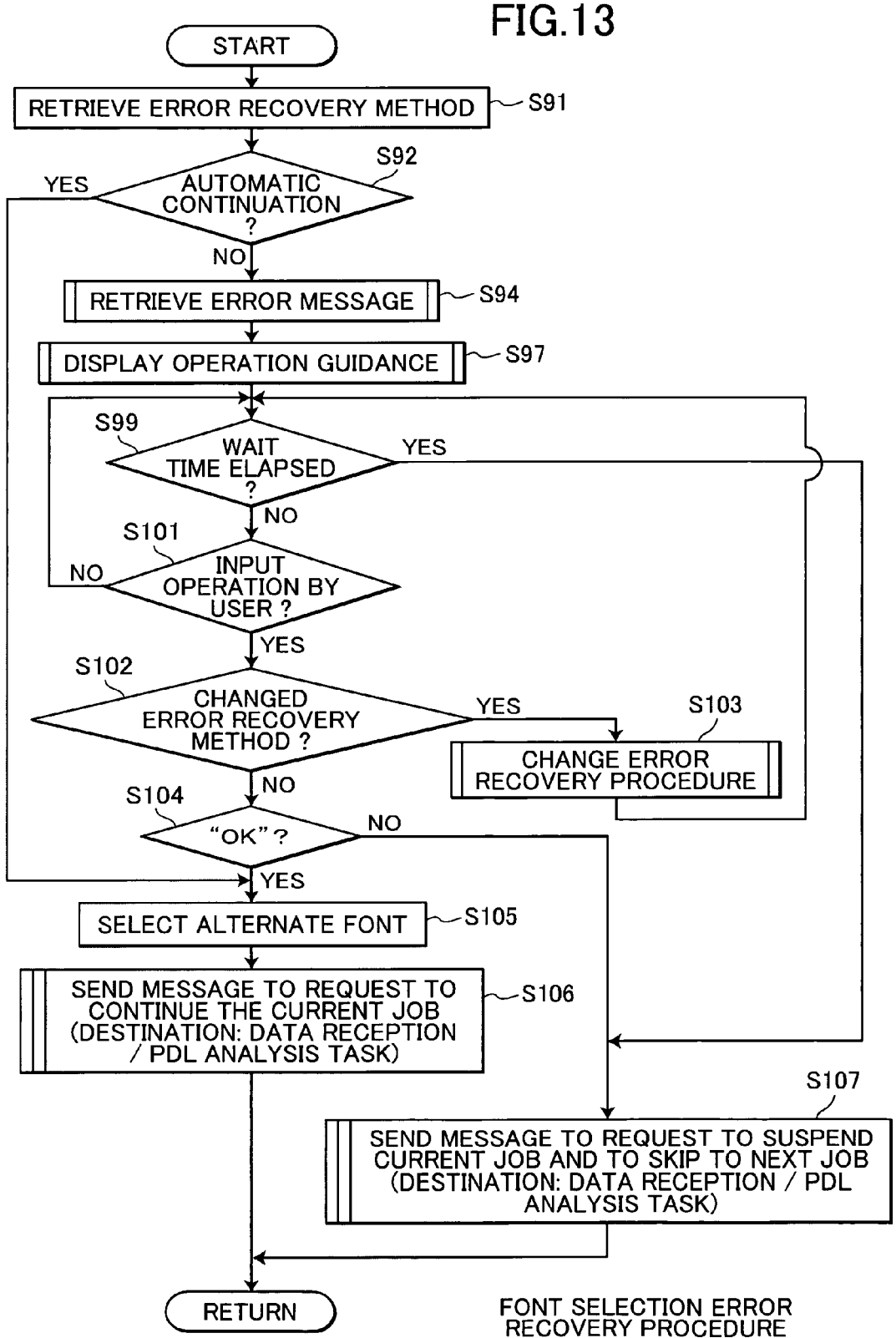
FIG. 13 is a flowchart representing a font selection error recovery procedure according to the embodiment of the present invention.

Next, the font selection error recovery procedure that is called and executed in S57 of FIG. 11 will be described with reference to the flowchart shown in FIG. 13. First in S91, an error recovery method corresponding to the "font selection error" is retrieved based on the classification code by referring to the error recovery method definition file 12d (FIG. 6). Then, in S92, it is determined whether or not the retrieved error recovery method is the automatic print continuation. If so (S92: YES), then the procedure proceeds to S105. If not (S92: NO), then the procedure proceeds to S94. Since procedures executed in S94 through S104 are substantially the same as the above-described procedures in S64 through S74, description thereof will be omitted. It should be noted, however, that the operation guide message window 42 displays an error message "The specified font is not available" in this case. Also, if a positive determination is made in S99 (S99: YES), then the procedure proceeds to S107.

If it is determined in S104 that the OK button has been pressed (S104: YES), or if a positive determination is made in S92 (S92: YES), then the procedure proceeds to S105, where an alternate font whose attributes are closest to those of the specified font is selected. At this time, if there is no font that resembles the specified font (for example, when there are only alphabetic fonts, and no Japanese fonts are available), character codes are replaced by symbols, such as blanks (JIS Code: 0x2222) or square symbols (JIS Code: 0x2223). Selection of an alternate font is performed in accordance with definition in the PDL specification. In S106, a message to request to continue the current job is transmitted to the data reception/PDL analysis task as a message for self task, and subsequently the procedure returns. Here, if the data reception/PDL analysis task receives in S10 (FIG. 8) the message for self task transmitted in S106, then an analysis procedure is executed in S11 while the command string for font selection is converted into a command string for using the alternate font for printing.

If it is determined in S104 that the OK button has not been pressed (S104: NO), this means that the CANCEL button has been pressed, and the procedure proceeds to S107. In S107, a message to request to suspend the current job and to skip to next job is transmitted to the data reception/PDL analysis task as a message for self task, and then the procedure returns. Here, if the data reception/PDL analysis task receives in S10 (FIG. 8) the message for self task transmitted in S107, then the PDL analysis of the current print job is suspended, and the procedure waits for reception of a next message for self task (print job). The suspended print job is stored in the nonvolatile memory 12 as a print queue so that the print operation may be resumed by the user as desired.

Figure 14:
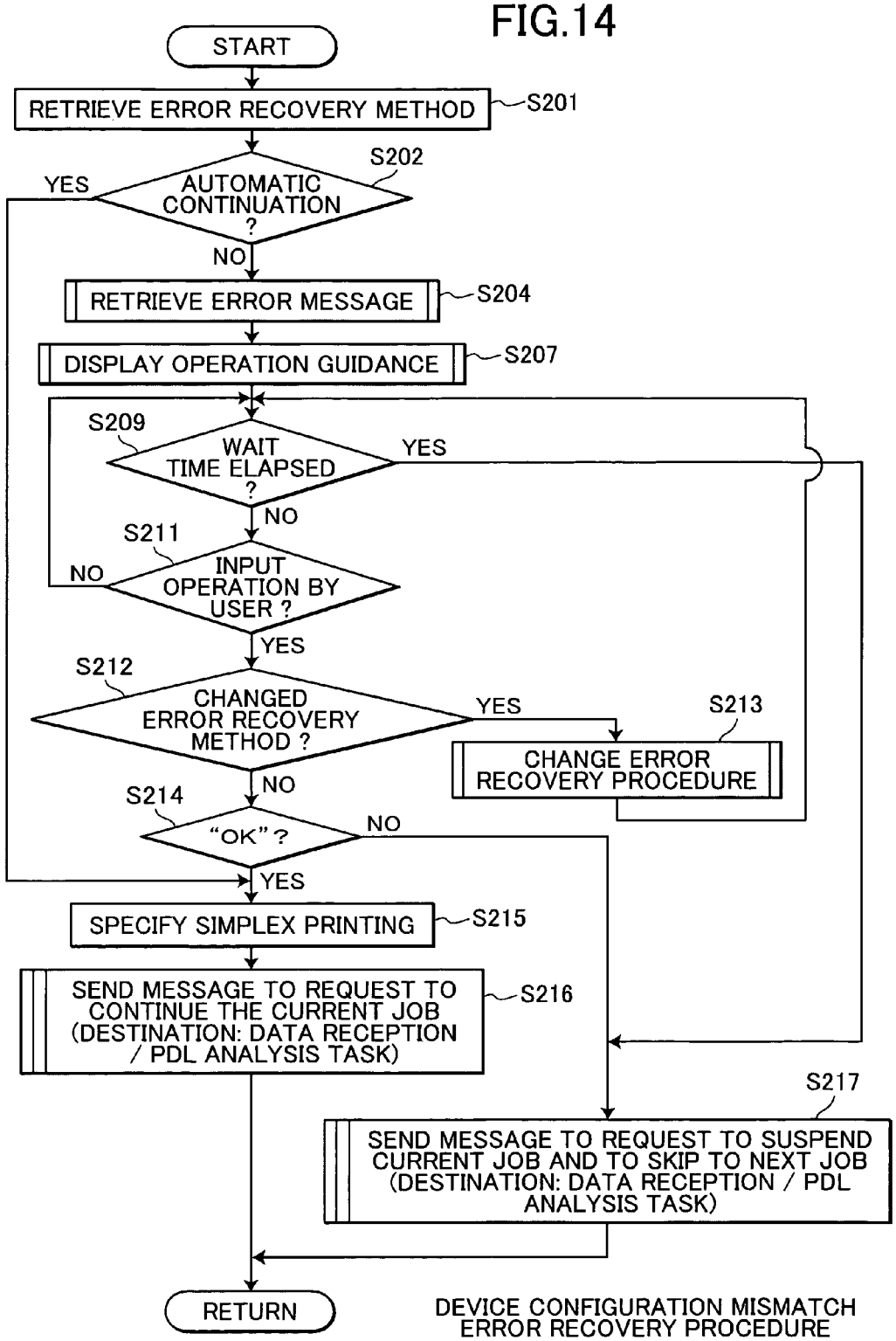
FIG. 14 is a flowchart representing a device configuration mismatch error recovery procedure according to the embodiment of the present invention.

Next, the device configuration mismatch error recovery procedure that is called and executed in S58 of FIG. 11 will be described with reference to the flowchart shown in FIG. 14. In the following description, it is assumed that a device configuration mismatch error has occurred because the print mechanism 20 of the printer 1 is only for the simplex printing (one-side printing) and the printer 1 has received print data specifying duplex printing (both-side printing).

First in S201, an error recovery method corresponding to the "device configuration mismatch error" is retrieved based on the classification code by referring to the error recovery method definition file 12d (FIG. 6). Then, in S202, it is determined whether or not the retrieved error recovery method is automatic print continuation. If so (S202: YES), then the procedure proceeds to S215. If not (S202: NO), then the procedure proceeds to S204. Since procedures in S204 through S214 are substantially the same as the procedures in S64 through S74, description of these procedures will be omitted. In this case, however, the operation guide message window 42 displays an error message "simplex printing only. duplex printing is specified". Also, when a positive determination is made in S209 (S209: YES), then the procedure proceeds to S217.

If it is determined in S214 that the OK button has been pressed (S214: YES), or if a positive determination is made in S202 (S202: YES), then the procedure proceeds to S215. In S215, specified printing requirement that cannot be met is changed to a printing requirement that can be met. In this example, duplex printing requirement is changed to simplex printing requirement. Then, in S216, a message to request to continue the current job is transmitted to the data reception/PDL analysis task as a message for self task, and subsequently the procedure returns. Here, if the data reception/PDL analysis task receives in S10 (FIG. 8) the message for self task transmitted in S216, then an analysis procedure is executed in S11 while converting a command string specifying duplex printing into a command string specifying simplex printing. As a result, the print mechanism 20 performs simplex printing although duplex printing was originally specified.

If it is determined in S214 that the OK button has not been pressed (S214: NO), this means that the CANCEL button has been pressed, and then the procedure proceeds to S217. In S217, a message to request to suspend the current job and to skip to next job is transmitted to the data reception/PDL analysis task as a message for self task, and subsequently the procedure returns. Here, if the data reception/PDL analysis task receives in S10 (FIG. 8) the message transmitted in S217, the PDL analysis of the current print job is suspended, and the procedure waits for reception of a next message for self task (print job). The suspended print job is stored in the nonvolatile memory 12 as a print queue that the print operation may be resumed by the user as desired.

Figure 15:
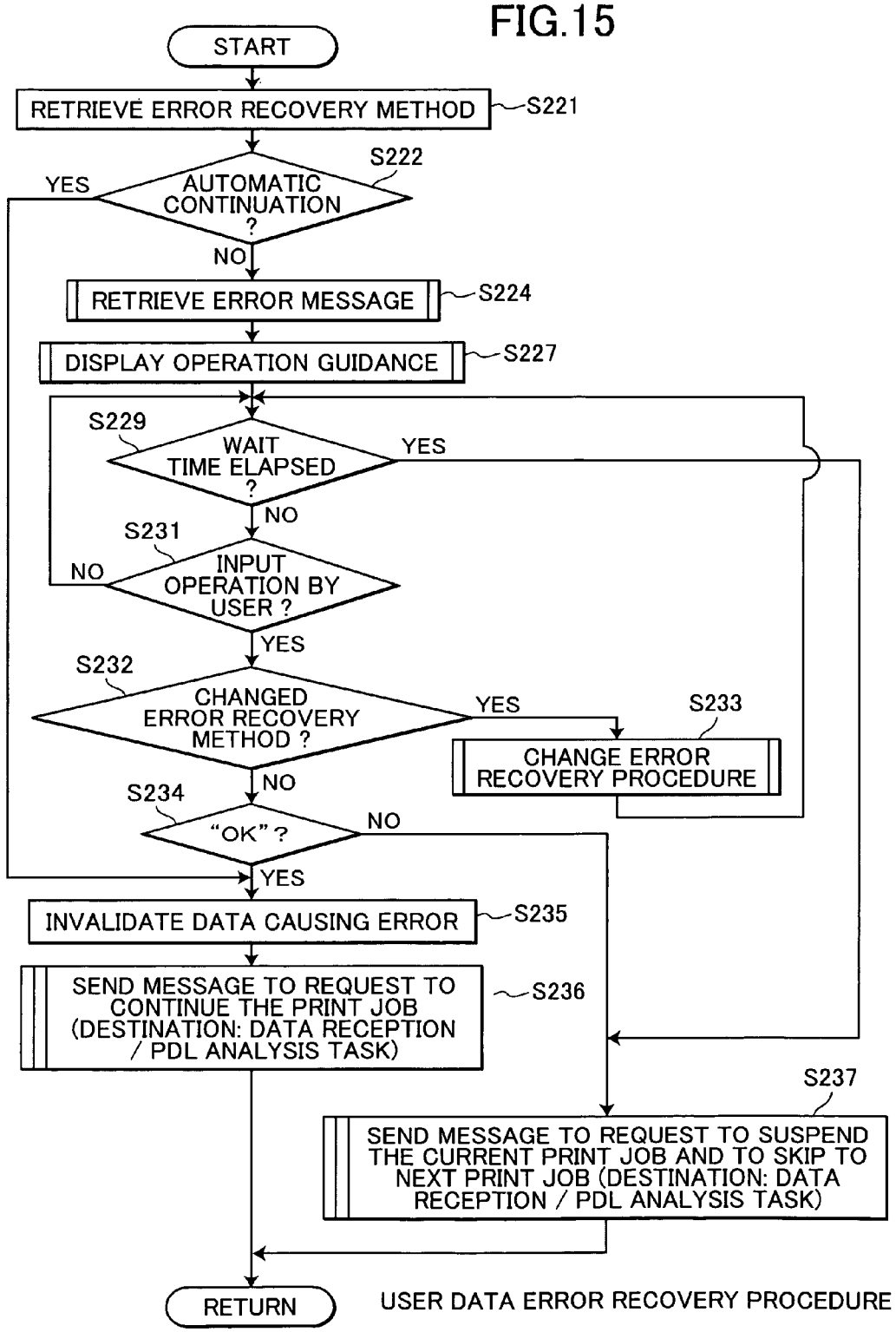
FIG. 15 is a flowchart representing a user data error recovery procedure according to the embodiment of the present invention.

The user data error recovery procedure that is called and executed in S59 of FIG. 11 will be described with reference to the flowchart shown in FIG. 15. First in S221, an error recovery method corresponding to the "user data error" is retrieved based on the classification code by referring to the error recovery method definition file 12d (FIG. 6). Then, in S222, it is determined whether or not the retrieved error recovery method is automatic print continuation. If so (S222: YES), then the procedure proceeds to S235. If not (S222: NO), then the procedure proceeds to S224. Because procedures in S224 through S234 are substantially the same as the above-described procedures in S64 through S74, description of these procedures will be omitted. In this case, however, the operation guide message window 42 displays various messages depending on the cause of error. For example, if the cause is an invalid overlay data, then the operation guide message window 42 displays an error message "overlay data invalid". If a positive determination is made in S229 (S229: YES), then the procedure proceeds to S237.

If it is determined in S234 that the OK button has been pressed (S234: YES), or if a positive determination is made in S222 (S222: YES), then the procedure proceeds to S235. In S235, data that have caused the error is made invalid, and then in S236, a message to request to continue the current print job is transmitted with an invalidating command to the data reception/PDL analysis task as a message for self task, and subsequently the procedure returns. Here, if the data reception/PDL analysis task receives in S10 (FIG. 8) the message for self task transmitted in S236, then an analysis procedure is executed in S11 while discarding the invalidated data. As a result, if the error is an overlay data invalid error for example, the print operation is continued without overlay.

If it is determined in S234 that the OK button has not been pressed (S234: NO), this means that the CANCEL button has been pressed, and the procedure proceeds to S237. In S237, a message requesting suspension of the current print job is transmitted to the data reception/PDL analysis task as a message for self task, and subsequently the procedure returns. Here, if the data reception/PDL analysis task receives in S10 (FIG. 8) the message for self task transmitted in S237, the PDL analysis of the current print job in S11 is suspended, and the procedure waits for reception of a next message for self task (next print job). The suspended print job is stored in the nonvolatile memory 12 as print queue so that the print operation may be resumed by the user as needed.

As described above, according to the present invention, a user can set whether to execute an automatic print continuation for when a print error occurs for each of a plurality of error categories. Therefore, a print device that can prevent unexpected printing results and that is excellent in operationality is provided.

In the above-described embodiment, when an error occurs in a printer and if automatic print continuation has been set for a corresponding error category, then the printer automatically executes an error recovery procedure to ignore the error. If, on the other hand, an automatic print continuation has not been set for the corresponding error category, an error message is displayed, prompting a user to input an instruction. At this time, if the user instructs printing continuation, an error recovery procedure is executed to continue print operation. However, if the user instructs suspension of print operation or if the user does not input any instruction, then the print job is suspended, and the procedure proceeds to a procedure for a next print job. Thus, the printer can automatically print a large volume of data without being attended by the user when an automatic print continuation is set, whereas the user can intervention to execute an appropriate error recovery procedure when a corresponding error recovery method is set to a recovery by user's operation. Since the user can set either an automatic print continuation or a recovery by user's operation for each error category, any error can be dealt with appropriately depending on its nature. This also enables a large amount of consecutive printing without causing printing results differing from expected ones, since an error recovery procedure is executed in a manner desired by a user.

Because the error recovery method definition file 12d is stored in the nonvolatile memory 12, the error recovery method definition file 12d is not lost even if the main power of the printer 1 is turned OFF.

Because the errors that may occur in the printer 1 are classified into error categories in accordance with the nature of each error, and because the user can set an error recovery method for each error category, the user does not need to set an error recovery method for each one of the errors, reducing burden on the user.

While some exemplary embodiments of this invention have been described in detail, those skilled in the art will recognize that there are many possible modifications and variations which may be made in these exemplary embodiments while yet retaining many of the novel features and advantages of the invention.

For example, when print job is suspended because of data readout error due to non-existence of a form overlay file or the like, a guide message could be displayed on a display device for guiding a user to register the form overlay data.

The print control program 12a, the error recovery method selection program 12b, and the error recovery program 12c could be stored in a computer readable non-volatile storing medium, such as hard disk or ROM. The CPU can invoke these programs and execute corresponding procedures. Alternatively, the programs could be loaded into the RAM from the storing medium.

What is claimed is:

1. A printer comprising:
    a print unit that performs a print operation to print images on a recording medium based on operatable print data;
    an error detecting unit that detects a predetermined error during the print operation, the predetermined error occurring when print data inputted into the printing unit is other than the operatable print data, the print operation being performable without change even if the error occurs, the predetermined error having a nature;
    a categorizing unit that categorizes the detected predetermined error into one of a plurality of given categories based on the nature, wherein each of said given categories includes a plurality of different predetermined errors from among the predetermined errors;
    a setting unit that sets one error recovery method selected by a user from among different error recovery methods for each of a plurality of print continuation error categories, the error recovery methods including an automatic print continuation and a recovery by user's operation;
    a memory that stores a correspondence data indicating the set error recovery method selected by said user of each error category;
    a method detecting unit that detects an error recovery method selected by said user corresponding to the categorized error category with reference to the correspondence data stored in the memory; and
    an error recovery unit that executes an error recovery procedure according to the error recovery method selected by said user detected by the method detecting unit.

2. The printer according to claim 1, further comprising a display unit for displaying a message and an input unit for a user to input various instructions, wherein:
    in response to the error recovery method detected by the method detecting unit being an automatic print continuation recovery method, the error recovery unit automatically executes an error recovery procedure, displays an information on the display representing the error recovery procedure and, in response to receiving a continue command from a user within a given time window relative to the display, controls the printing unit to continue the print operation and, in response to not receiving the continue command from the user within the given time window, executing a skip printing procedure; and
    in response to the error recovery method detected by the method detecting unit being a user operation recovery method the error recovery unit controls the display to display an error message and an operation guide message, prompting the user to input an instruction, and executes an error recovery procedure in accordance with the instruction from the user.

3. The printer of claim 1, wherein the memory is a non-volatile memory.

4. The printer of claim 1, further including an updating unit for receiving an updating instruction including said error recovery method selected by said user from the user and for updating the correspondence data in accordance with said updating instruction.

5. A storing medium storing a control program for controlling a printer, the control program comprising the programs of:
    performing a print operation to print images on a recording medium based on operatable print data;
    detecting a predetermined error during the print operation, the predetermined error occurring when print data inputted into the printing unit is other than the operatable print data, the print operation being performable without change even if the predetermined error occurs, the predetermined error having a given nature; .
    categorizing the detected predetermined error into one of a plurality of categories based on the nature, each category including a plurality of the predetermined errors;
    setting one error recovery method selected by a user from among different error recovery methods for each of the plurality of print continuation error categories, the error recovery methods including an automatic print continuation recovery and a recovery by user's operation;
    detecting an error recovery method corresponding to the categorized error category with reference to a correspondence data stored in a memory; and
    executing an error recovery procedure selected by a user according to the detected error recovery method.

6. The storing medium of claim 5, wherein the executing control program further comprises the programs of:
    automatically executing, in response to the detected error recovery method selected by a user being an automatic print continuation, an error recovery procedure according to the automatic process set for said automatic print continuation method by the received user commands, and controlling the printing unit to continue the print operation without waiting for an instruction from the user; and
    in response to the detected error recovery method being the user's operation recovery method, executing a controlling of a display unit to display an error message and an operation guide message, prompting the user to input an instruction, and executing an error recovery procedure in accordance with the input instruction.

7. A printer enabling a user to set error recovery method for each error category comprising:
    a printer controller that controls a print mechanism that performs a print operation to print images on a recording medium based on print data received from a host computer;
    a user interactive input device with which a user can input various settings and instructions; and
    a display device for user interactive processing operations which displays various windows including an automatic print continuation setting window and an operation guide message window;
    the printer controller including a central processing unit (CPU), a nonvolatile memory, and a random access memory (RAM), the nonvolatile memory storing a print control program, an error recovery method selection program, an error recovery program, an error category definition file, and an error recovery method definition file, the CPU controlling various components of the printer according to the programs stored in the nonvolatile memory, the print control program storing a printing control procedure including an error recovery procedure, the error recovery method selection program allowing a user to select an error recovery method for each print continuation error category and updates the error recovery method definition file according to the error recovery method selected by the user, the error recovery program storing a procedure for, depending on an error category of a detected error, automatically executing an error recovery procedure or controlling the display device to display, on the operation guide message window, an error message and an operation guide message corresponding to the error category so as to prompt the user to input an instruction as to whether to continue printing or not, the CPU detecting an error during the print operation based on the print data received from a host computer when print data inputted into the printing unit is other than the operatable print data, the print operation being performable without change even if the error occurs, determining an error category of the detected error and executing a procedure according to the determined error category.

8. The printer according to claim 7, wherein errors are classified into at least four categories including "sheet size mismatch error", "font selection error", "device configuration mismatch error", and "user data error".

9. The printer according to claim 8, wherein the "sheet size mismatch error" occurs when the size of recording sheet mounted in the print mechanism does not agree with the size specified by the data received from the host computer, the "font selection error" occurs when the printer controller does not have a font whose attributes match the font attributes specified by the received data from the host computer, the "device configuration mismatch error" occurs when the print mechanism cannot perform a print operation in a manner specified by the received data from the host computer for mechanical reasons, and the "user data error" occurs when received data from the host computer is in a data format that the printer cannot deal with or when a specified form overlay file is not provided in the printer.

10. The printer of claim 1, comprising an automatic print continuation setting window that is usable by a user before starting a print operation to invoke an error recovery method selection program, wherein the automatic print continuation setting window displays said error categories with each error category separately listed, and with each error category having associated therewith a yes/no indication, selectable by the user, with regard to whether automatic print continuation is the error recovery method for that error category.

11. The printer of claim 10, wherein the automatic print continuation setting window displays:

a sheet size mismatch error category along with a yes/no indication for automatic print continuation associated with said sheet size mismatch error category;

a font selection error category along with a yes/no indication for automatic print continuation associated with said font selection error category;

a device configuration mismatch error category along with a yes/no indication for automatic print continuation associated with said device configuration mismatch error category; and a user data error category along with a yes/no indication for automatic print continuation associated with said user data error category.

12. The printer of claim 10, including a font selection error category that is subject to being set by the user to "yes" for automatic print continuation, and a device configuration mismatch error category that is subject to being set by the user to "yes" for automatic print continuation.

13. The printer of claim 10, in which at least one error category has a yes/no indication with regard to automatic print continuation that has been selected by the user to "yes", and subsequently when an error that has an error category that had been selected to "yes" with regard to automatic print continuation, the printer performs automatic print continuation.

14. The storing medium of claim 5, wherein the control program comprises a program of displaying an automatic print continuation setting window on which displays said error categories with each error category separately listed, and with each error category having associated therewith a yes/no indication selectable by the user, with regard to whether automatic print continuation is the error recovery method for that error category;

the automatic print continuation setting window being useable by the user before starting of a print operation.

15. The printer of claim 7, wherein the automatic print continuation setting window is usable by a user before starting a print operation to invoke an error recovery method selection program, wherein the automatic print continuation setting window displays said error categories with each error category separately listed, and with each error category having associated therewith a yes/no indication, selectable by the user, with regard to whether automatic print continuation is the error recovery method for that error category.

* * * * *